United States Patent
Engelko et al.

(10) Patent No.: US 9,881,035 B2
(45) Date of Patent: Jan. 30, 2018

(54) SYSTEMS AND METHODS FOR IN-PLACE MIGRATION WITH DOWNTIME MINIMIZATION

(71) Applicant: SAP SE, Walldorf (DE)

(72) Inventors: Andrey Engelko, Bad Schoenborn (DE); Klaus Daschakowsky, Bad Schoenborn (DE); Joerg Schoen, Nussloch (DE); Florian Thomas, Schifferstadt (DE); Christiane Valentin, Malsch (DE)

(73) Assignee: SAP SE, Walldorf (DE)

( * ) Notice: Subject to any disclaimer, the term of this patent is extended or adjusted under 35 U.S.C. 154(b) by 515 days.

(21) Appl. No.: 14/568,959

(22) Filed: Dec. 12, 2014

(65) Prior Publication Data

US 2016/0170977 A1 Jun. 16, 2016

(51) Int. Cl.
G06F 17/30 (2006.01)

(52) U.S. Cl.
CPC ...... *G06F 17/303* (2013.01); *G06F 17/30595* (2013.01)

(58) Field of Classification Search
CPC .................. G06F 17/303; G06F 17/30595
USPC ........................................................ 707/609
See application file for complete search history.

(56) References Cited

U.S. PATENT DOCUMENTS

| | | | |
|---|---|---|---|
| 8,356,010 B2* | 1/2013 | Driesen | G06F 17/303 707/610 |
| 8,412,739 B2* | 4/2013 | Engelko | G06F 17/30377 707/791 |
| 9,626,390 B2* | 4/2017 | Bentzien | G06F 17/303 |
| 2002/0087552 A1* | 7/2002 | Applewhite | G06F 17/30569 |
| 2004/0122865 A1* | 6/2004 | Stahl | G06F 17/303 |
| 2009/0259618 A1* | 10/2009 | Shi | G06F 17/30339 |
| 2010/0153341 A1* | 6/2010 | Driesen | G06F 17/303 707/661 |
| 2012/0041988 A1* | 2/2012 | Driesen | G06F 17/30297 707/803 |
| 2012/0166393 A1* | 6/2012 | Hoprich | G06F 17/30289 707/634 |
| 2012/0239616 A1* | 9/2012 | Cunningham | G06F 17/30578 707/620 |
| 2012/0265726 A1* | 10/2012 | Padmanabhan | G06F 17/303 707/602 |
| 2014/0143263 A1* | 5/2014 | Ritter | G06F 17/30303 707/756 |

(Continued)

FOREIGN PATENT DOCUMENTS

EP 2763055 A1 * 8/2014

*Primary Examiner* — Kris E Mackes
*Assistant Examiner* — Thuy T Bui
(74) *Attorney, Agent, or Firm* — Jones Day

(57) ABSTRACT

A system and method for database migration is provided. In an example embodiment, the database migration technique may include a first connection to a relational database, a second connection to an in-memory database, and a migration framework to analyze the data structures of the relational database so as to identify first and second subsets of data structures. The first subset of data structures is migrated to the in-memory database during an uptime period of the relational database, and the second subset of data structures is migrated to the in-memory database during a downtime period of the relational database.

9 Claims, 5 Drawing Sheets

(56) References Cited

U.S. PATENT DOCUMENTS

2014/0279914 A1\* 9/2014 Bester .............. G06F 17/30563
706/640

\* cited by examiner

400

500

SYSTEMS AND METHODS FOR IN-PLACE MIGRATION WITH DOWNTIME MINIMIZATION

FIELD OF INVENTION

The present invention generally relates to systems and methods for database migration, and more particularly, to systems and methods for in-place migration with downtime minimization.

BACKGROUND

Numerous business process applications are presently used to conduct business operations. Applications may be programs that an end-user executes to perform certain tasks. Such applications may be executed in conjunction with one or more backend systems, which may store large amounts of data in a variety of formats. Example backend systems may include database systems, enterprise resource planning (ERP) systems, customer relationship management (CRM) systems, and business warehouse (BW) systems, etc.

By manipulating the data stored within backend systems, users may generate various business process objects, such as sales orders, invoices, etc. A business object may be created using known computing systems and languages (e.g., advanced business application programming (ABAP) which is available from SAP AG, Walldorf, Germany). Such objects may be stored within backend systems. In addition, objects are typically stored using tabular format(s).

Relational databases are popular tools for storing such objects and for organizing relational data for subsequent analysis. Relational databases may involve large amounts of data and data structures, and require complex coding to query the database or otherwise communicate with user applications. Due to the complexity of the data and the required coding, a large investment of time and labor resources is necessary to create a functional relational database.

In addition, the size and complexity of relational databases may cause difficulties in moving relational databases between platforms. Often database users may combine a system update with a number of different activities such as database migration or Unicode conversion. For example, a number of challenges may arise during migration of an existing BW or ERP system to an in-memory database system, such as SAP® high-performance analytic appliance (HANA). Migration to other database platforms, such as Sybase adaptive server enterprise (ASE), is also feasible. As HANA may utilize Unicode and have a certain release level, an existing database system may require a system update and other intermediate steps prior to migration. In addition, database migration may cause long downtimes for implementation.

Accordingly, there is a need in the art for faster and more efficient systems and methods for migrating existing relational databases between platforms. The embodiments described herein provide systems and methods for in-place migration with downtime minimization.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
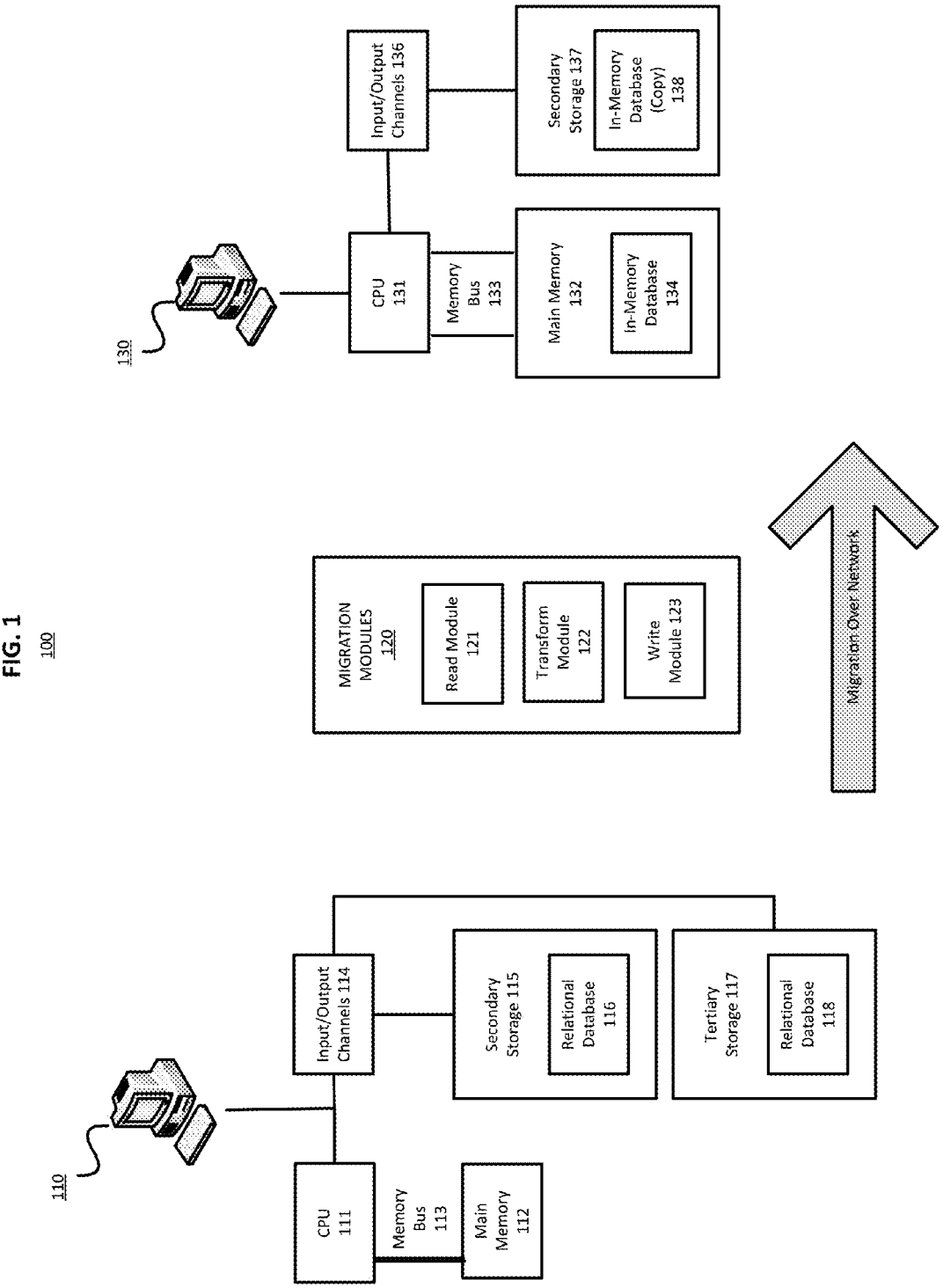
FIG. 1 is a block diagram showing the migration of data from a source computer system to a target computer system according to an example embodiment.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

Embodiments of the present invention provide a database migration system including a migration framework which may analyze a source database and its associated access coding, and based on these analyses generates a target database. For example, embodiments of the present disclosure provide systems and methods that migrate source databases, or portions thereof, to target relational databases.

In an example embodiment, the database migration technique may include a first connection to a source database, a second connection to a target relational database, and a migration framework. The migration framework may analyze the data (e.g., records) of the source database so as to identify first and second subsets of data. It is understood by one of ordinary skill in the art that the migration framework may include numerous additional functions. The first subset of data is migrated to the target database during an uptime period of the source database, and the second subset of data is migrated to the target database during a downtime period of the system(s) using relational database.

In some instances, the target database may include an in-memory database. Throughout the discussion that follows, an in-memory database is often used as an example target database. However, the embodiments of the invention are not limited to an in-memory target database.

In-memory databases are located within the main memory of a computer system or other device, which provides the advantage of faster data access and faster program execution. One benefit of an in-memory database as compared to other relational database types is that data access is orders of magnitude faster using an in-memory database. In-memory databases also enable real-time operation on a computer or device, or on multiple computers or devices communicating through wired or network connections. An example of an in-memory database is the SAP® HANA in-memory database system.

An increasing number of database users are expected to migrate their database systems to in-memory systems, such as SAP® HANA. However, the conversion from relational databases to in-memory databases has disadvantages. Depending on the characteristics of the existing database system, this kind of migration may consist of a number of sophisticated system transformations. Common transformations include system update and Unicode conversion.

A common disadvantage of conventional conversion processes is prolonged system downtime. The terms uptime and downtime will be used herein to describe a functional state of a system as well as the accessibility of the system by one or more users. Thus, a system can only be operating and accessible during uptime, but a system can have downtime and may not be accessible by a typical user.

FIG. 1 is a block diagram showing the migration of data from a source computer system to a target computer system according to an example embodiment. As shown in FIG. 1, migration system 100 includes source computer system 110, migration modules 120, and target computer system 130.

In the depicted example configuration, data is migrated from a source computer system 110 containing a relational database to a target computer system 130 containing an in-memory database. Throughout the disclosure, migration between a source relational database and a target in-memory database is described. However, the source and target databases are examples, and the migration systems and methods may be applied to other database platforms. In addition, the migration techniques described herein are not limited to migrating one relational database to one in-memory database. One or multiple relational databases, or specific portions thereof, may be migrated to separate in-memory databases, consolidated into one in-memory database, or segregated into multiple in-memory databases.

Source computer system 110 may contain at least one relational database and target computer system 130 may include at least one computer or other device containing an in-memory database according to an example embodiment. Source computer system 110 includes a computer system having a central processing unit (CPU) 111 and main memory 112 directly accessible to CPU 111 via memory bus 113. The CPU 111 utilizes input/output channels 114 to communicate with secondary storage 115 and tertiary storage 117. Secondary storage 115 may include hard disk drives or other mass data storage devices, and tertiary storage 117 may include compact discs, flash memory drives, removable hard disk drives, magnetic tape drives, and/or other removable mass data storage media.

Source computer system 110 contains at least one relational database. As shown in FIG. 1, relational database 116 is stored in secondary storage 115, and relational database 118 is stored in tertiary storage 117. However, multiple relational databases can be stored in secondary storage 115 and tertiary storage 117, and FIG. 1 should not be considered as limiting the disclosure in this manner.

One or more of the relational databases contained in secondary storage 116 and one or more of the relational databases stored in tertiary storage 117 may be migrated to target computer system 130. In some example embodiments, only selected portions of these relational databases may be migrated. In other example embodiments, multiple relational databases, or portions thereof, may be combined to form a single in-memory database. Whether one or more of the relational databases stored in source computer system 110 are migrated may be determined based on the design needs and objectives to be accomplished. Furthermore, whether only portions of the relational databases are migrated, or the relational databases are migrated in their entirety, is similarly determined by design needs and objectives.

As illustrated in FIG. 1, the relational databases are migrated to target computer system 130. Target computer system 130 includes at least one computer or device having a CPU 131 and a main memory 132 directly accessible to CPU 131 via memory bus 133. Target computer system 130 further includes a secondary storage 137, in communication with the CPU 131 via input/output channels 136. The at least one computer or device comprising target computer system 130 may be a server, a desktop computer, a laptop computer, a tablet computer, a smartphone, a personal digital assistant, a palmtop computer, or other portable computing device, or any combination of these devices. If multiple devices are included in target computer system 130, data communication between the devices can be implemented using wired, wireless, or network connections.

Upon completion of migration, the source (e.g., relational) databases of source computer system 110, or portions thereof, may be stored as databases in main memory 132 of target computer system 130. This is shown in FIG. 1 as in-memory database 134, but this disclosure is not limited to in-memory databases. In addition, one or multiple target databases may be generated as a result of the migration. For example, the relational databases of source computer system 110 may be distributed between in-memory database 134 and in-memory database 138. In another example, the in-memory database may also be copied into secondary storage 137 of target computer system 130, as indicated by numeral 138, to allow for non-volatile storage of the in-memory database 134. Once the migration is completed, the in-memory databases 134, 138 may be accessed by the target computer system 130 or any other device in wired, wireless, or network communication with the target computer system 130.

Migration modules 120 may include numerous modules to implement the migration functions. Among these modules, are read module 121, transform module 122, and write module 123. Although illustrated separately, it is understood by one of ordinary skill in the art that the migration functions may be implemented by the source and/or target computer systems. Alternatively, the migration modules 120 may be implanted by a dedicated server.

During a migration procedure, read module 121 may retrieve the one or more portions of the source database to be transmitted to a target database. Transform module 122 may execute transformations to the data retrieved form a relational database, as desired. After completion of the transformations, write module 123 may transmit the data to a database at target computer system 130.

A migration procedure may be executed over a variety of network types, including any type or combination of public or private, wired or wireless networks including, for example, a local area network (LAN), a wide area network (WAN), a virtual private network (VPN), the Internet, etc. Various combinations and layers of network protocols may operate over the network, including, for example, hypertext transfer protocol (HTTP), remote function call (RFC), Ethernet (i.e., IEEE 802.3 CSMA/CD Ethernet), Wireless (e.g., IEEE 802.11, IEEE 802.16, ETSI HYPERLAN/2, Bluetooth, General Packet Radio Service or GPRS, LTE, etc.), Transmission Control Protocol/Internet Protocol (TCP/IP), Asynchronous Transfer Mode (ATM), etc.

Figure 2:
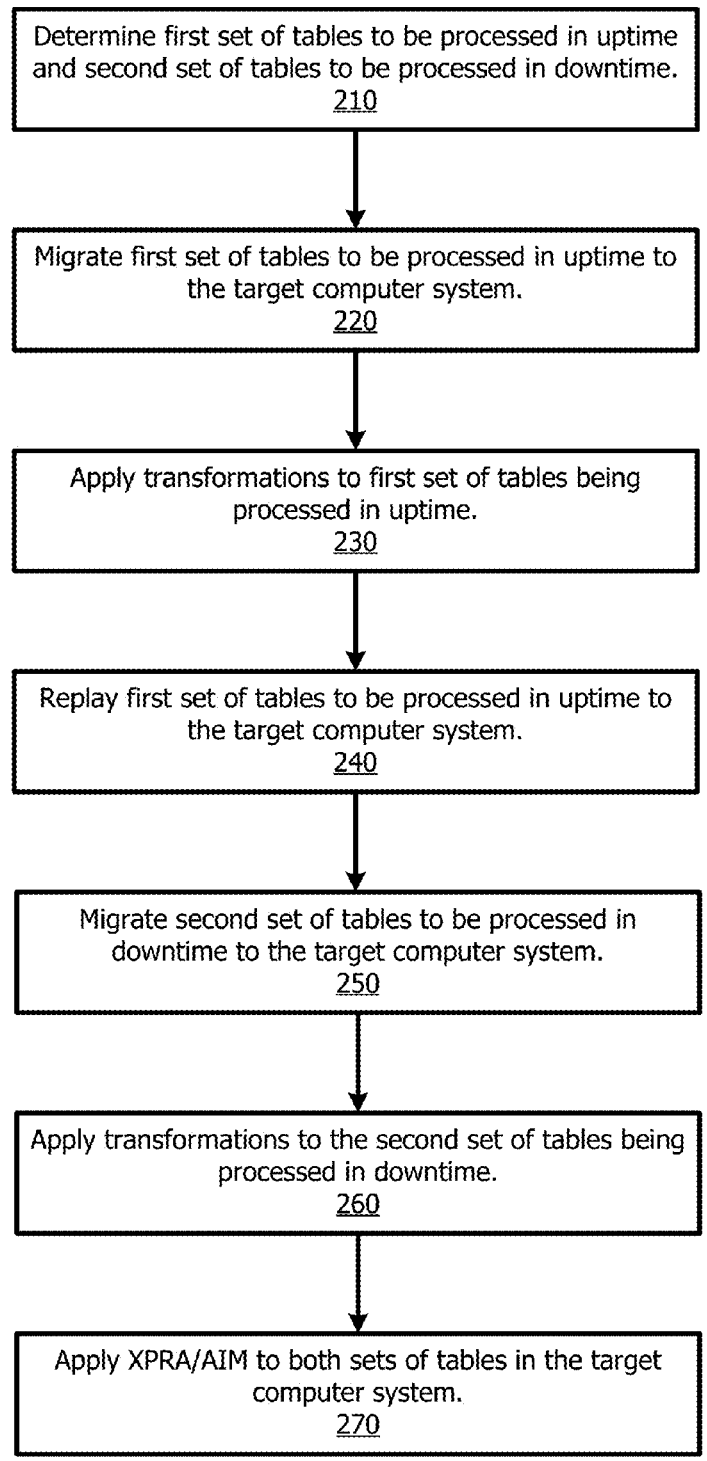
FIG. 2 is a flow chart of a method for the migration of a source database to a target database according to an example embodiment.

FIG. 2 is a flow chart of a method 200 for the migration of a source database to a target database according to an example embodiment. At 210, the read engine 121 of the migration modules 120 determines a first set of tables to be processed during uptime and a second set of tables to be processed during downtime. The first and second sets of tables originating from and being stored at the source computer system 110. For example, the first set of tables may be among the larger tables of the source database. The determination of one or more large tables may be achieved by comparing the size of each table to one or more predetermined thresholds. Alternatively, the determination of the set of one or more large tables may be achieved by comparing the number of entries in each table to one or more predetermined thresholds. In another example, the second set of tables may include smaller tables being changed by an upgrade process.

At 220, the determined first set of tables (e.g., large tables) may be migrated by migration modules 120 and/or target computer system 130 during an uptime period of the source computer system 110. At 230, the migration modules 120 may apply a structural adjustment to the first set of tables. For example, a structural adjustment function may apply one or more algorithms to the migrated data to adjust the structure of the source database to the structure of the target database. In some instances, structural adjustment implementations also provide functionality for handling conversions including de-clustering as well as Unicode and structural conversions.

Next, at 240, record and replay functions may be applied to the first set of tables to be processed in uptime to the target computer system 130. For example, a record function may capture changes applied to data in the source database and a replay function may transfer changed data from the source to the target database.

Accordingly, the various database tables of the target computer system 130 may be adjusted during an uptime period. The remaining tables (e.g., the second set of tables), especially more critical tables, may be migrated to the target computer system 130 during a downtime period.

After completing the migration of the first set of tables, the second set of tables may be migrated by migration modules 120 and/or target computer system 130 during a downtime period of the source computer system 110, at 250. At 260, the migration modules 120 may apply a structural adjustment to the second set of tables.

Lastly, at 270, certain after import methods (AIMs) and/or execution of programs after import (XPRAs) may be executed to both the first and second set of tables in the target computer system 130.

An AIM may be a method (e.g., an executable program) configured to modify one or more databases so that the database(s) are compatible with, for example, a target computer system and target database. In some embodiments, an AIM can be configured to produce runtime information, and/or can be configured to generate code that can produce runtime information. In some embodiments, an AIM can be configured to facilitate transport and/or import of one or more of database(s). In some embodiments, an AIM can be configured to operate on multiple databases. For example, in some embodiments, a specific AIM can be configured to produce or make multiple databases compatible with a first platform (e.g., source computer system) based on metadata associated with the multiple databases and/or based on metadata associated with multiple databases compatible with a second platform (e.g., target computer system).

Similar to an AIM, an XPRA can be a method (e.g., an executable program) configured to modify one or more of the databases (e.g., shadow databases, user databases) so that the database(s) are compatible with, for example, a system upgrade. In some embodiments, an XPRA may not be configured to produce runtime information. In some instances, an XPRA can be configured as a single-use method configured to operate on a single database. For example, in some embodiments, an XPRA can be configured to convert data included in a database from a first format (e.g., an original format) associated with a first system (e.g., source computer system) to a second format (e.g., a different format) associated with a second system (e.g., target computer system). In some embodiments, the XPRA may only be executed once, because after the data and/or structure of the database has been converted from the first format to the second format, the data and/or structure of the database object that is later manipulated by the second system will be compatible with the second system because the second system already functions based on the second format.

Figure 3:
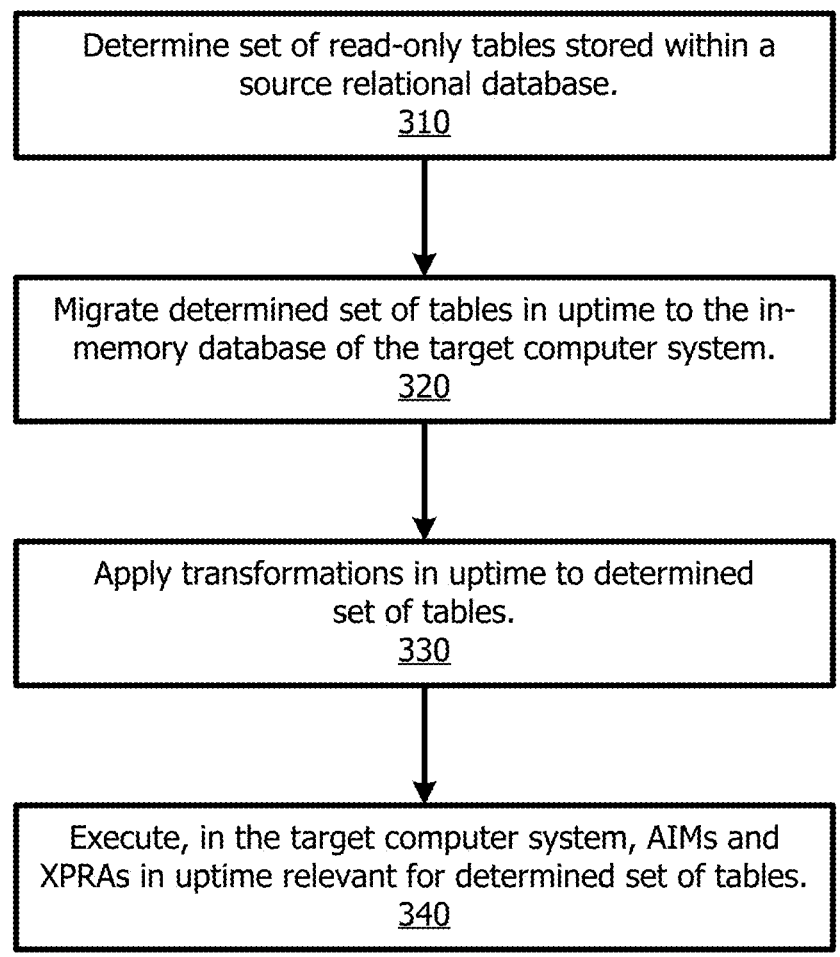
FIG. 3 is a flow chart of a method for the migration of a source database to a target database according to another example embodiment.

FIG. 3 is a flow chart of a method 300 for the migration of a source database to a target database according to another example embodiment.

At 310, the read engine 121 of the migration modules 120 determine a set of one or more read-only tables stored within a source database to be migrated during uptime. In some embodiments, a user may desire to migrate critical tables during an uptime period. Alternatively, or in addition, tables within source computer system 110 may be prioritized based on an assigned or calculated criticality factor. For example, tables assigned to a "high" (i.e., critical) priority level may be migrated to target computer system 130 during an uptime period. In another example, tables having a calculated criticality factor (e.g., based on a number entries, or number of times accessed) that exceeds a predetermined threshold may be migrated to target computer system 130 during an uptime period. In some embodiments, a user may even migrate all tables during an uptime period. Here, a read engine 121 may gather data from the source database. A recording procedure may be applied to capture the changes made during an uptime migration. For example, the read engine 121 may ensure that only committed data is read. Uncommitted data (e.g., data in process) may be disregarded by the read engine 121. At 320, the determined set of tables may be migrated to migration modules 120 and/or target computer system 130 during an uptime period of the source computer system 110.

Next, at 330, structural adjustments may be applied to the determined set of tables during an uptime period. Lastly, at 340, certain AIMs and/or XPRAs may be designated for execution for the determined set of tables during an uptime period.

Thus, by applying the method 300, example large tables that can be set to read-only may be processed in uptime only. For such large read-only tables, AIMs and/or XPRAs may also be executed in uptime. As a result, downtime is minimized.

Figure 4:
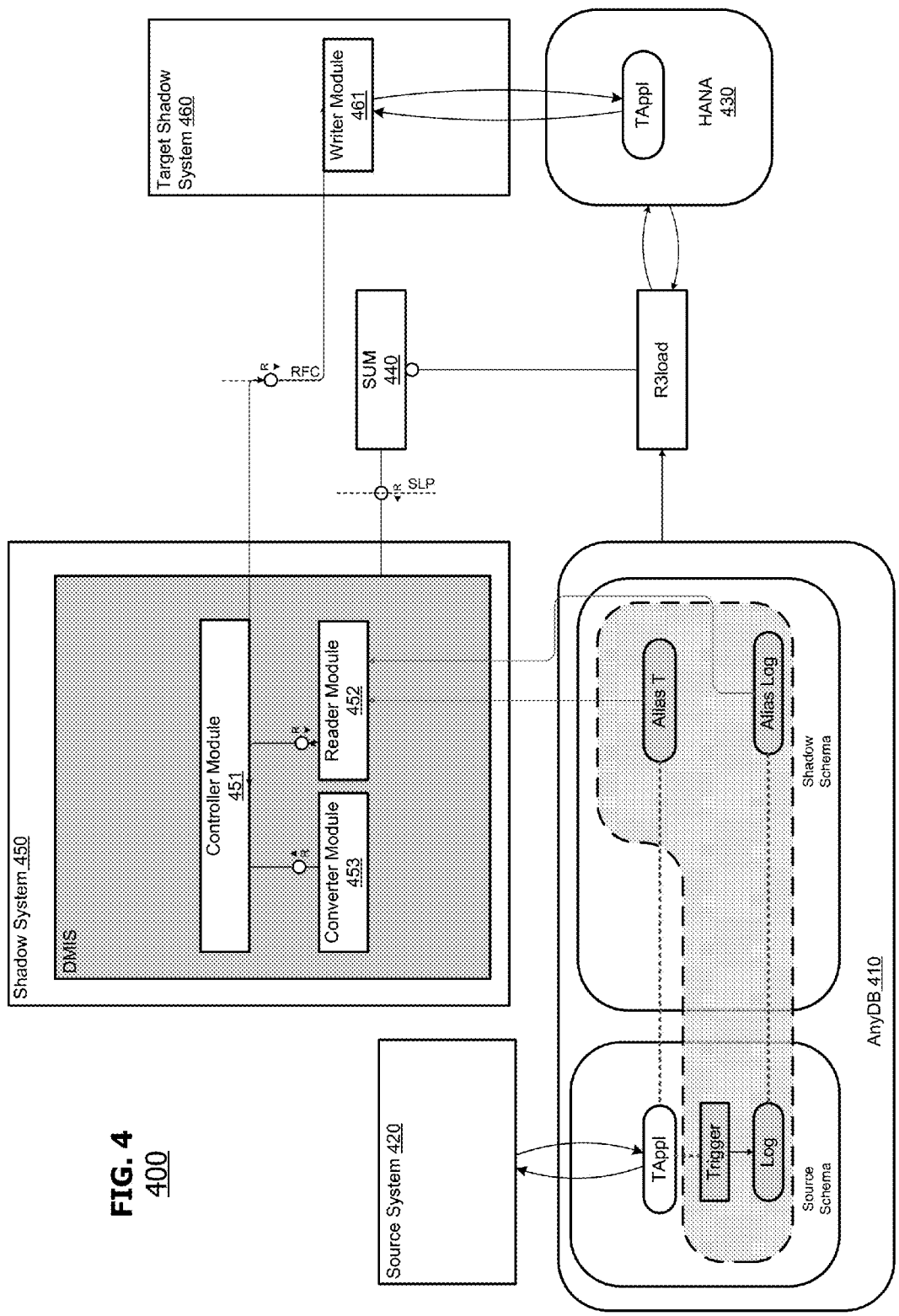
FIG. 4 is a block diagram that illustrates a system migration architecture configured to facilitate migration of an original database system using a shadow system.

FIG. 4 is a block diagram that illustrates a system migration architecture 400 configured to facilitate a migration of an original system using a shadow system. As shown in FIG. 4, the architecture 400 includes an original database system 410, source system 420, target database system 430, software update manager 440, original shadow system 450, and target shadow system 460.

The shadow systems 450, 460 are environments within which certain operations of a migration or upgrade process may be performed so that corresponding databases 410, 430 may continue to operate in an active mode (e.g., remain in an uptime period, continue in a normal operational environment). As can be understood, each of shadow systems 450, 460 can be referred to as a "shadow system" because portions of the shadow systems 450, 460 may mirror (or "shadow") certain portions of the corresponding databases 410, 430 (i.e., non-shadow systems). For example, the shadow systems 450, 460 may include one or more portions (e.g., databases, executable files, etc.) that correspond with portions (e.g., databases, executable files, etc.) of corresponding databases 410, 430. Portions of the shadow systems 450, 460 that correspond with the portions of databases 410, 430 may be upgraded versions (e.g., modified versions) or exact copies.

Each of the shadow systems 450, 460 can be a stand-alone device and/or module, a server, a software and/or hardware system, a virtual system, a system (e.g., an SAP system) defined based ABAP, etc. The shadow systems 450, 460 may be generated and/or deleted according to the migration procedure.

Original shadow system 450 may include controller 451 coupled to reader module 452 and converter module 453. Similarly, target shadow system may include a controller (not shown) and writer module 461. Data may be exchanged between shadow and non-shadow systems using reader module 452 and writer module 461, for example. In addition, various transformations, such as structural adjustments, may be executed by converter module 453. In some embodiments, original shadow system 450 may be coupled to SUM 440 such that software updates may be executed within a shadow system.

Migration processes of databases 410, 430 may be performed on data stored within shadow systems 450, 460 while the corresponding databases 410, 430 operate in an uptime period. The corresponding portions of the shadow systems 450, after being upgraded (e.g., by SUM 440) or migrated, may subsequently be copied into (and replace portions of) the corresponding database 430. Alternatively, databases may be directly loaded ("R3load") from the original to the target database.

By performing certain portions of the upgrade process on the shadow systems 450, 460 rather than directly on databases 410, 430, the downtime of devices accessing databases 410, 430 can be substantially reduced. In some instances, downtimes may also be reduced by performing certain portions of the upgrade or migration process directly on the corresponding databases 410, 430 (i.e., not shadow systems 450, 460).

In some embodiments, the shadow systems 450, 460 may be defined specifically for use during the upgrade process. For example, the shadow systems 450, 460 may be a temporary system created for use during an upgrade or migration of the corresponding system 410, 430. After the non-shadow system 410, 430 has been upgraded or migrated, the respective shadow system 450, 460 and/or logs associated with the shadow system 450, 460 may be deleted.

Source and target databases systems 410, 430 may include a variety of tables, data structures, and functional modules configured to implement database migration. For example, the source database system 410 may include database triggers, logging tables, application tables, shadow tables, etc. Database triggers may update one or more logging tables ("Log") when a dataset is created, deleted, and/or updated. Although not shown, an application table may be used to store data from the source system 420. Lastly, modules may be used to communicate within the source database system 410. For example, the alias module of the shadow schema may be coupled to the reader module 452.

Figure 5:
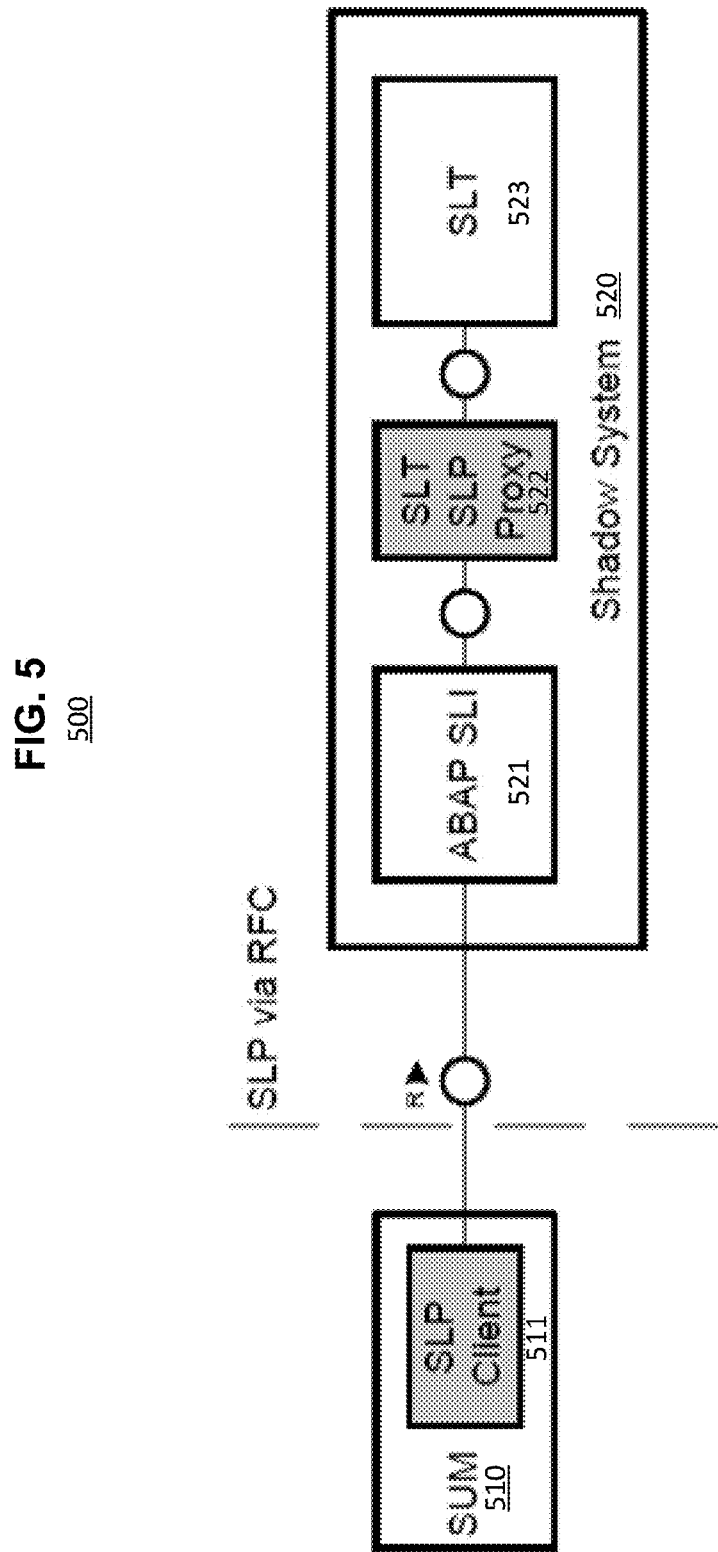
FIG. 5 is a block diagram that illustrates communication architecture between a software update manager and a shadow system.

FIG. 5 is a block diagram that illustrates a communication architecture 500 between a software update manager 510 and a shadow system 520. As shown in FIG. 5, client modules of SUM 510 may be coupled to shadow system 520 using a communication protocol. To avoid additional the costs associated with setting up a HTTPS connection in the shadow system, the landscape protocol may be implemented using other proprietary protocols, such as remote function call (RFC).

Within shadow system 520, ABAP-type objects 521 may be processed by landscape transformation modules 523. In some instances, proxy modules 522 may be used to interface between a storage unit of ABAP-type objects 521 and landscape transformation modules 523.

Using embodiments of the invention, in-place database migration with downtime minimization may be achieved. Once the migration process is complete, many benefits of in-memory databases may be realized. For example, in-memory databases may deliver increased data access speed compared to relational databases stored outside of main memory, and consequently may provide faster program execution. Real-time program execution may also be implemented due to the increased speed of program execution. In-memory databases may also be accessed from desktop computers or portable devices such as laptop or tablet computers and smartphones, which may be placed in data communication using wired, wireless, or network connections.

It should be understood that there exist implementations of other variations and modifications of the invention and its various aspects, as may be readily apparent to those of ordinary skill in the art, and that the invention is not limited by specific embodiments described herein. Features and embodiments described above may be combined with and without each other. It is therefore contemplated to cover any and all modifications, variations, combinations or equivalents that fall within the scope of the basic underlying principals disclosed and claimed herein.

We claim:
1. A database migration system, comprising:
one or more processors; and
memory storing a plurality of integrated programs for execution by the one or more processors, one of the plurality of integrated programs including:
a first connection to a relational database;
a second connection to an in-memory database;
a migration framework to automatically analyze the data structures of the relational database so as to identify first and second subsets of data structures,
wherein:
the first subset of data structures is migrated to the in-memory database by the migration framework during an uptime period of the relational database;
the second subset of data structures is migrated to the in-memory database by the migration framework during a downtime period of the relational database;
the migration framework includes a shadow relational database and a shadow in-memory database that are each environments within which operations of a migration or upgrade process can be performed so that the corresponding relational and in-memory databases can continue to operate in an active mode;
the migration framework consolidates multiple relational databases into a single in-memory database; and each of the first subset of data structures has a calculated criticality indicator that exceeds a predetermined threshold, the calculated criticality indicator being based either on a number of entries in each of the first subset of data structures or a number of time each of the first subset of data structures is accessed.

2. The database migration system of claim 1, wherein each of the first subset of data structures has a size that exceeds a predetermined threshold.

3. The database migration system of claim 1, wherein each of the first subset of data structures has a number of entries that exceeds a predetermined threshold.

4. A method for database migration, comprising:
connecting to a relational database;
connecting to an in-memory database;
providing a migration framework to automatically analyze the data structures of the relational database so as to identify first and second subsets of data structures, wherein:
the first subset of data structures is migrated to the in-memory database by the migration framework during an uptime period of the relational database;
the second subset of data structures is migrated to the in-memory database by the migration framework during a downtime period of the relational database;
the migration framework includes a shadow relational database and a shadow in-memory database that are each environments within which operations of a migration or upgrade process can be performed so that the corresponding relational and in-memory databases can continue to operate in an active mode;
the migration framework consolidates multiple relational databases into a single in-memory database; and
each of the first subset of data structures has a calculated criticality indicator that exceeds a predetermined threshold, the calculated criticality indicator being based either on a number of entries in each of the first subset of data structures or a number of time each of the first subset of data structures is accessed.

5. The method for database migration of claim 4, wherein each of the first subset of data structures has a size that exceeds a predetermined threshold.

6. The method for database migration of claim 4, wherein each of the first subset of data structures has a number of entries that exceeds a predetermined threshold.

7. A non-transitory computer readable storage medium storing one or more programs configured to be executed by a processor, the one or more programs comprising instructions for:
connecting to a relational database;
connecting to an in-memory database;
providing a migration framework to automatically analyze the data structures of the relational database so as to identify first and second subsets of data structures, wherein:
the first subset of data structures is migrated to the in-memory database by the migration framework during an uptime period of the relational database;
the second subset of data structures is migrated to the in-memory database by the migration framework during a downtime period of the relational database;
the migration framework includes a shadow relational database and a shadow in-memory database that are each environments within which operations of a migration or upgrade process can be performed so that the corresponding relational and in-memory databases can continue to operate in an active mode;
the migration framework consolidates multiple relational databases into a single in-memory database; and
each of the first subset of data structures has a calculated criticality indicator that exceeds a predetermined threshold, the calculated criticality indicator being based either on a number of entries in each of the first subset of data structures or a number of time each of the first subset of data structures is accessed.

8. The computer readable storage medium of claim 7, wherein each of the first subset of data structures has a size that exceeds a predetermined threshold.

9. The computer readable storage medium of claim 7, wherein each of the first subset of data structures has a number of entries that exceeds a predetermined threshold.

* * * * *